March 29, 1960
L. A. WOOD
2,930,639
LENGTH ADJUSTING STRUCTURE
Filed Nov. 1, 1954
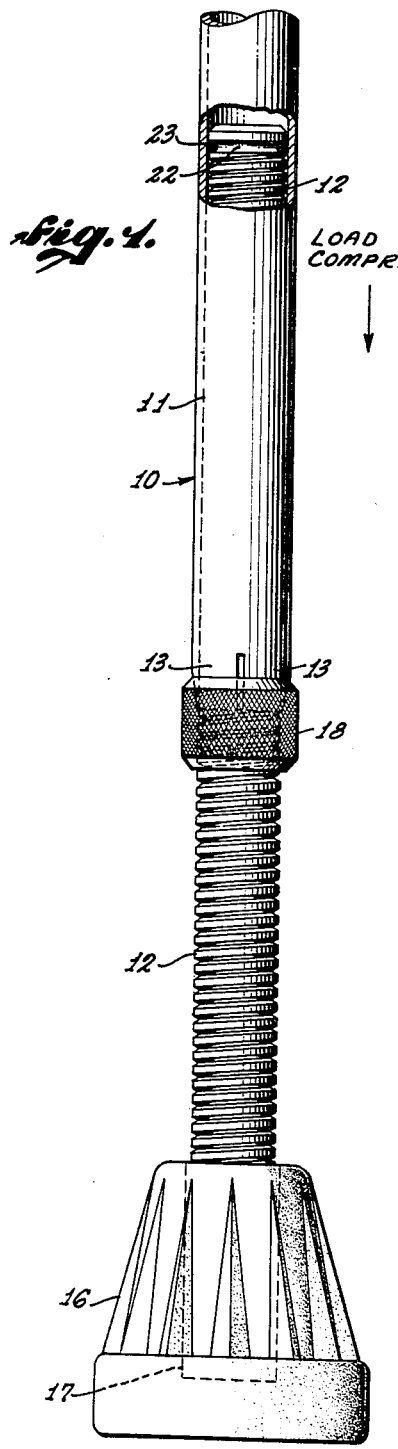
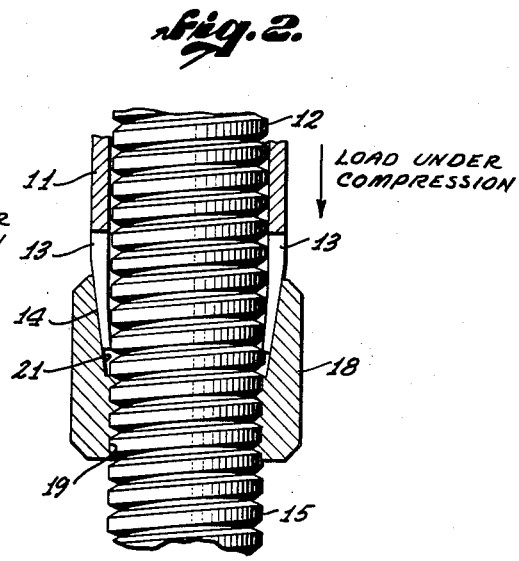
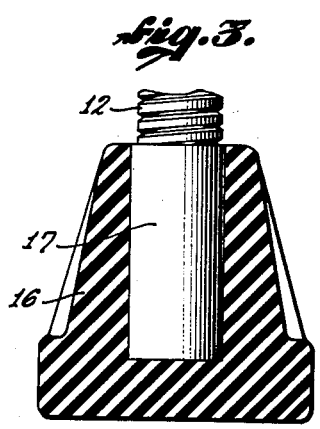
Lorin A. Wood,
INVENTOR.
BY George V. Smyth
ATTORNEY.

United States Patent Office 2,930,639
Patented Mar. 29, 1960

2,930,639

LENGTH ADJUSTING STRUCTURE

Lorin A. Wood, Los Angeles, Calif.

Application November 1, 1954, Serial No. 466,174

6 Claims. (Cl. 287—58)

This invention relates to a length adjusting structure capable of quick and simple adjustment to vary the length of tubular members such as crutches, furniture legs and the like.

The instant application is illustrative of the manner in which the invention may be applied to crutches of the general type disclosed in by copending application, Ser. No. 355,520, now Patent No. 2,736,330. Users of crutches would like to be able to quickly and simply effect a change in the length of the crutch. Such a change in length, as it results in a change in the support action of the crutch, in turn adjusts or alters the pressure of the pads under the arms of the user. Although the present invention is particularly useful as a means for quickly adjusting the length of the main support member of a crutch, it is not necessarily limited to such a field of use for it can be used in any field where there is a need to vary the length of a tubular member.

This invention fulfills that need and includes, in the illustrated embodiment thereof, an elongate body member, such as used in the crutch of my said copending application, comprising a tubular element which terminates in a slotted end portion presenting a plurality of resilient fingers. The wall thickness of the tubular element at the end portion is progressively reduced to provide an exterior taper, the conical surface of the end portion defining an angle of low magnitude with the longitudinal axis of the tubular element. The body member cooperates with a threaded rod mounting a resilient pedal element at the one end thereof and having its opposing end telescopically mounted within the end portion so that a portion of the rod coaxially projects from the tubular element.

The length of the crutch is determined by the position of the threaded rod relative to the elongate tubular element and to rigidly mount the rod in a selected position relative to the tubular element, a nut body is formed with a counterbore having an interior taper complementary to the exterior taper of the tubular element. This nut is also provided with a complementary threaded bore threadedly engaging the rod and is thus movable axially of the rod. The nut body is interlocked with the tubular element by compressively engaging the interior taper of the nut with the exterior taper of the tubular element.

The wedging action of the interlocked complementary tapering surfaces not only holds the nut body against rotation, but also inwardly deflects the resilient fingers into compressive engagement with the rod to thus interlock the tubular element, rod and nut body. This locking action is easily and quickly effected by merely urging the tapered lower end of the tubular element into the counterbore of the nut and the angle of taper, if maintained within a critical range, will bring about the desired locking action and thus rigidly mount the threaded rod in any desired axial position relative to the tubular element.

Although the coacting parts are securely held against movement, once the complementary tapered surfaces are interlocked, the parts can be quickly and easily disengaged to permit the nut to be axially moved through rotation relative to the rod. This disengagement is effected by a sharp angular jolt to the rod which can be brought about by striking the pedal element of the rod against the floor or other supporting surface with a relatively sharp blow, while at the same time dragging the pedal element across the floor. Once the wedge lock has been broken, the nut can be axially moved on the rod and the parts again rigidly locked together by merely jamming the exterior tapered end portion of the tubular element into the complementary interior taper of the nut.

To hold the tubular element and rod against accidental relative movement whenever the tapered surfaces of the element and nut body are disengaged, the present invention provides means carried by the rod and resiliently engaged with the inner wall surface of the tubular element for resisting such movement. This means furthermore resiliently supports the end of the rod carried within the tubular element as it is compressed between the latter and the rod.

An object of this invention is to provide a tubular body member with a quick and simple length adjusting structure.

Another object of this invention is to provide a tubular body member with a length adjusting structure which is simple in design and manufacture, but yet efficient and extremely rigid in all adjusted positions.

A further object of this invention is to provide a tubular body member with a length adjusting structure which will unlock upon receiving a sudden angular jolt and permit readjustment by actuation of a single nut and then relocking in the new position by mere reengagement of the parts.

Other objects and advantages will appear from the following description of the structure illustrated in the embodiment of the invention, reference being had to the accompanying drawings, in which:

Figure 1 is an elevational view partly in section of the length adjusting structure;

Figure 2 is an enlarged sectional view showing the tubular element interlocked with the rod and nut body under the action of the nested tapers of the element and nut body; and Figure 3 is a view in section of the pedal element mounted on the end of the rod.

The length adjusting structure of the present invention and particularly the illustrated body thereof, comprises a body member 10 which cooperates with a tubular element 11 and a rod 12, the one end portion of which is telescopically received within the lower end of the tubular element 11. The lower end of the element 11 is formed with a plurality of slots defining circumferentially spaced resilient fingers 13. The wall thickness of the terminal portion of the tubular element 11 is progressively reduced to the end so that the tubular element 11 terminates in an exteriorly tapered end portion 14. The angularity of the taper is somewhat critical and this angle should be approximately 7½ degrees. The rod 12 is formed with an external acme-type thread throughout substantially its entire length, the thread forming a spheral flat or land 15 of a diameter substantially equal to the tubular element 11. This physical relationship of the diameter permits the rod to be telescopically fitted within the lower end of the element to thus form an extension of the element.

The rod, as should now be seen, forms the terminal portion of the body member 10 and the projecting end of the rod is preferably fitted with a pedal member 16 of resilient material. To facilitate mounting of the pedal member 16, the normally lower end of the rod 12 is formed as a cylindrical section 17, as clearly illustrated in Figure 3 of the drawing.

The length of the crutch can be effectively adjusted or altered by varying the amount of projection of the rod 12 from the tubular element 11. To hold the rod 12 in a desired position of adjustment relative to the tubular element 11, the present invention provides an anchoring member 18, here shown as a cylindrical nut body, having a bore 19 formed with an internal thread complementary to the threads of the rod 12. It will thus be seen that the nut body 18 can be moved longitudinally of the rod 12 through relative rotation of the nut body and rod.

The nut body is formed with a counterbore 21 which is formed with a conical wall portion having a taper substantially equal to the taper of the lower end of the tubular element 11. The external taper of the tubular element, as hereinabove mentioned, is on the order of 7½ degrees and this tapered end portion of the tubular element, if forced into the tapered counterbore of the nut body, brings about a wedging action which interlocks the nut body 18 to the lower end of the tubular element 11. Furthermore, when the tapering surfaces 14 and 21 are tightly engaged, the fingers 13 are urged radially inward to compressively engage against the flat or land 15 of the threads of the rod and the latter is rigidly held against movement. Thus, the tubular element 11, the rod 12, and the nut 18 are rigidly interlocked and the over-all length of the crutch remains constant so long as the tapering surfaces 14 and 21 are wedingly interlocked.

To change the length of the crutch, it is first necessary to disengage the tapering surfaces 14 and 21, which is easily accomplished by merely striking the pedal element 16 with some angularity against a surface, such as a floor, and at the same time dragging the pedal element across the surface. This action releases the interlocked tapering surfaces 14 and 21 and leaves the nut body 18 free to be selectively repositioned along the rod 12 by rotating the nut body until the latter occupies the new preselected position on the rod. When the nut body 21 is in the preselected new position, the exterior and interior tapering surfaces 14 and 21 can be again interlockingly engaged by wedging the two surfaces together as by a compressive force against the tubular element 11 with the pedal member 16 engaged with a support surface such as a floor.

Where the invention, for example, is embodied in a crutch of the general type shown in my copending application hereinabove identified, the crutch can be lengthened or shortened merely by disengaging the tapering surfaces and after which the nut can be rotated to move the same to a preselected position on the rod. Once the nut body has been repositioned, merely the weight of the user of the crutch is sufficient to again wedgingly interlock the tapering surfaces 14 and 21.

To prevent the rod 12 from moving axially out of the tubular element 11 whenever the surfaces 14 and 21 are disengaged, the rod is preferably formed with an annular groove 22 adjacent the inner end thereof. A resilient ring 23, such as an O-ring, is mounted in the groove 22 and this ring is of such a size as to resiliently bear against the inner wall surface of the tubular element 11. The resilient engagement between the ring 23 and the inner wall surface of the element 11 is sufficient to restrain the rod 12 against accidental movement longitudinally of the element 11, but should not be sufficient to prevent deliberate movement of the rod 12. The O-ring 23, furthermore, as it is compressed between the wall of the groove 22 and the inner wall surface of the tubular member also serves as a resilient bearing member supporting the inner end of the rod 12.

It will be seen now that the present invention provides a very simple but yet extremely rugged extensible length structure. The interlocking wedging action between the tapering surfaces 14 and 21 will rigidly interconnect the tubular element 11 with the nut body 18 and the rod 12. With the nut body 18 held against rotational movement and the rod 12 immobilized in the preselected projected position relative to the tubular element, the structure is extremely rugged and stable but yet does permit a simple and easily accomplished length adjustment.

Although the now preferred embodiment of the present invention has been shown and described herein, it is to be understood that the invention is not to be limited thereto, for it is susceptible to changes in form and detail within the scope of the appended claims.

I claim:

1. An elongated support structure of adjustable length carrying loads under longitudinal compression of the type described, comprising: a tubular body member forming one longitudinal portion of said structure and having a slotted end portion presenting a plurality of resilient fingers, said end portion having an exterior taper of approximately seven and one-half degrees; a threaded rod forming a second adjacent longitudinal portion of said support structure and telescopically received through said end portion and within said body member; a cylindrical nut having a first part presenting an interior taper complementing said exterior taper and a second part presenting an internal thread complementing and threadingly engaging said rod, said nut being selectively positionable along said rod for engaging said interior taper with said exterior taper to wedgingly contract said fingers against said rod thereby locking said rod to said body member with the compression loading of the support structure acting additionally to wedgingly contract said fingers against said rod, said rod presenting an annular groove adjacent the end thereof within said body member; and a resilient ring in its normal state expandable beyond the circumference of said rod, said ring being mounted in said groove for constraining said rod against accidental movement relative to said body member whenever said tapering surfaces are disengaged.

2. An elongated support structure of adjustable length carrying loads under longitudinal compression, comprising: a tubular body member forming one longitudinal portion of said structure and having a slotted end portion presenting a plurality of resilient fingers, said end portion having an exterior taper of the order of seven and one-half degrees; a threaded rod forming a second adjacent longitudinal portion of said support structure and telescopically received through said end portion and within said body member; a nut body having a first part presenting an interior taper complementing said exterior taper and a second part presenting an internal thread complementing and threadingly engaging said rod, said nut being selectively positionable along said rod for engaging said interior taper with said exterior taper to wedgingly contract said fingers against said rod thereby locking said rod to said body member with the compression loading of the support structure acting additionally to wedgingly contract said fingers against said rod, the end of said rod received within said body member presenting an annular groove; a resilient O-ring having an outer circumference exceeding that of said rod, said O-ring being mounted in said groove for frictionally retarding withdrawal movement of said rod from said tubular member, the opposite end of said rod being cylindrical and threadless; and a resilient pedal element mounted on said last named end for frictionally engaging a surface.

3. An elongated support structure of adjustable length carrying loads under longitudinal compression, comprising: a tubular body member forming one longitudinal load-carrying portion of said structure, said tubular body member having a smooth inner surface and having a slotted end portion presenting a plurality of resilient fingers, said end portion having an exterior taper; a threaded rod forming a second adjacent longitudinal portion of said support structure and telescopically received through said end portion and within said body member; and a nut having a first part presenting an interior taper complementing said exterior taper and a second part presenting an internal thread complementing and threadingly engaging said rod, said nut being selectively positionable along said rod for lockingly engaging said interior taper with said exterior taper and to wedgingly contract said fingers against said rod thereby locking said rod to said body member with the compression loading of the support structure acting additionally to wedgingly contract said fingers against said rod.

4. An elongated support structure of adjustable length carrying loads under longitudinal compression, comprising: a tubular body member forming one longitudinal load-carrying portion of said structure, said tubular body member having a smooth inner surface and having a slotted end portion presenting a plurality of resilient fingers, said end portion having an approximately seven and one-half degrees exterior taper; a threaded rod forming a second adjacent longitudinal portion of said support structure and telescopically received through said end portion and within said body member; and a nut body having a first part presenting an interior taper complementing said exterior taper and a second part presenting an internal thread complementing and threadingly engaging said rod, said nut being selectively positionable along said rod for engaging said interior taper with said exterior taper to wedgingly contract said fingers against said rod thereby locking said rod to said body member with the compression loading of the support structure acting additionally to wedgingly contract said fingers against said rod.

5. An elongated support structure of adjustable length carrying loads under longitudinal compression, comprising: a tubular body member forming one longitudinal load-carrying portion of said structure, said tubular body member having a smooth inner surface and having an inner and an outer surface and a slotted end portion presenting a plurality of resilient fingers, said end portion having an exterior taper of seven and one-half degrees from said outer surface tapered toward said inner surface; a threaded rod forming a second adjacent longitudinal portion of said support structure and telescopically received through said end portion and within said body member; a cylindrical nut having a first part presenting an interior taper complementing said exterior taper and a second part presenting an internal thread complementing and threadingly engaging said rod, said nut being selectively positionable along said rod for engaging said interior taper with said exterior taper to wedgingly contract said fingers against said rod thereby locking said rod to said body member with the compression loading of the support structure acting additionally to wedgingly contract said fingers against said rod, said exterior and interior tapers being adapted to quickly disconnect upon receipt of a sudden angular jolt whereby said exterior taper is freed from said interior taper to allow selective repositioning of said nut along said rod.

6. A structure as set forth in claim 5 in which means carried by said rod resiliently coact with the inner surface of said body member for restraining accidental relative movement of said body member and rod upon release of said tapered surfaces, and said means forming a bearing member resiliently supporting the inner end of said rod.

References Cited in the file of this patent

UNITED STATES PATENTS

| | | |
|---|---|---|
| 390,146 | Warner | Sept. 25, 1888 |
| 1,309,375 | Taylor | July 8, 1919 |
| 2,480,382 | Pagliuso | Aug. 30, 1949 |
| 2,481,271 | Willey | Sept. 6, 1949 |

FOREIGN PATENTS

| | | |
|---|---|---|
| 21,907 | Great Britain | of 1891 |
| 421,989 | France | of 1911 |